US012264633B1

(12) United States Patent
Phillips

(10) Patent No.: US 12,264,633 B1
(45) Date of Patent: Apr. 1, 2025

(54) COLD START CATALYST LIGHT-OFF

(71) Applicant: FCA US LLC, Auburn Hills, MI (US)

(72) Inventor: John D Phillips, Brighton, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/479,455

(22) Filed: Oct. 2, 2023

(51) Int. Cl.

| | |
|---|---|
| ***F02D 41/06*** | (2006.01) |
| ***F02D 13/02*** | (2006.01) |
| ***F02D 41/00*** | (2006.01) |
| ***F02D 41/02*** | (2006.01) |
| ***F02D 41/38*** | (2006.01) |
| ***F02M 27/04*** | (2006.01) |

(52) U.S. Cl.
CPC ....... *F02D 41/064* (2013.01); *F02D 41/0025* (2013.01); *F02D 41/0255* (2013.01); *F02D 41/38* (2013.01); *F02M 27/04* (2013.01); *F01N 2240/34* (2013.01); *F01N 2240/40* (2013.01); *F01N 2610/03* (2013.01); *F01N 2610/04* (2013.01); *F01N 2610/1406* (2013.01); *F01N 2900/1626* (2013.01); *F02D 2013/0292* (2013.01); *F02D 41/06* (2013.01); *F02D 41/068* (2013.01)

(58) Field of Classification Search
CPC ............... F01N 3/2006; F01N 2240/30; F01N 2240/34; F01N 2240/40; F01N 2410/06; F01N 2560/024; F01N 2560/025; F01N 2560/028; F01N 2570/16; F01N 2610/03; F01N 2610/04; F01N 2610/10; F01N 2610/1406; F01N 2610/1433; F01N 2900/04; F01N 2900/1626; F01N 2900/1822; F02D 2013/0292; F02D 19/0644; F02D 41/064; F02D 41/0025; F02D 41/0255; F02D 41/06; F02D 41/068; F02D 41/38; F02M 27/04
See application file for complete search history.

(56) References Cited

U.S. PATENT DOCUMENTS

| | | | | |
|---|---|---|---|---|
| 6,036,827 A * | 3/2000 | Andrews | B01D 53/9454 | 204/266 |
| 7,273,044 B2 * | 9/2007 | Flessner | F02D 19/066 | 123/536 |
| 7,922,781 B2 | 4/2011 | Chellappa et al. | | |
| 10,947,896 B1 * | 3/2021 | Jung | F02D 19/0671 | |
| 2009/0260363 A1 * | 10/2009 | Moriarty | F03G 6/001 | 310/156.01 |
| 2010/0147231 A1 * | 6/2010 | Bogers | C25B 15/08 | 123/3 |
| 2012/0167840 A1 * | 7/2012 | Miyagawa | F02D 19/0671 | 422/111 |
| 2018/0171870 A1 * | 6/2018 | Salek | F02C 6/18 | |
| 2018/0298813 A1 * | 10/2018 | Manthei | F02D 41/0025 | |

* cited by examiner

*Primary Examiner* — Binh Q Tran
(74) *Attorney, Agent, or Firm* — Jeremy J. Klobucar

(57) ABSTRACT

An internal combustion engine system includes an internal combustion engine, an exhaust aftertreatment system with a catalytic converter configured to receive exhaust gas from the internal combustion engine, and a light-off catalyst system including an electrolyzer configured to perform an electrolysis of water to produce a mixture of hydrogen and oxygen gases. A conduit is in fluid communication between the electrolyzer and an intake of the internal combustion engine. A controller is configured to supply the mixture of hydrogen and oxygen gases to the engine intake during a cold start to facilitate rapidly warming the catalytic converter to a light-off temperature.

20 Claims, 2 Drawing Sheets

COLD START CATALYST LIGHT-OFF

FIELD

The present application relates generally to vehicle engine exhaust treatment systems and, more particularly, to a system for reducing cold start emissions during a catalyst light-off phase.

BACKGROUND

In conventional engine exhaust aftertreatment systems it is difficult to achieve low tailpipe emissions in the time immediately following a cold engine start due to low catalyst conversion efficiency of cold catalysts. In order to achieve acceptable conversion efficiency, the catalyst must surpass a predetermined light-off temperature. In some systems, faster light-off temperatures may be achieved, but often at the cost of high exhaust system backpressure, durability, longevity, cost, and/or complexity. Thus, while such conventional systems do work for their intended purpose, it is desirable to provide continuous improvement in the relevant art.

SUMMARY

In accordance with one example aspect of the invention, an internal combustion engine system is provided. In one example implementation, the engine system includes an internal combustion engine, an exhaust aftertreatment system with a catalytic converter configured to receive exhaust gas from the internal combustion engine, and a light-off catalyst system including an electrolyzer configured to perform an electrolysis of water to produce a mixture of hydrogen and oxygen gases. A conduit is in fluid communication between the electrolyzer and an intake of the internal combustion engine. A controller is configured to supply the mixture of hydrogen and oxygen gases to the engine intake during a cold start to facilitate rapidly warming the catalytic converter to a light-off temperature.

In addition to the foregoing, the described engine system may include one or more of the following features: a water storage tank configured to selectively supply water to the electrolyzer; wherein the controller is configured to supply water to the electrolyzer when the engine is warmed; a pump configured to selectively supply the water from the water storage tank to the electrolyzer; a flow control valve disposed on the conduit to control the supply of the mixture of hydrogen and oxygen gases to the engine intake; and wherein the controller is in signal communication with the flow control valve.

In addition to the foregoing, the described engine system may include one or more of the following features: wherein the electrolyzer includes a housing, an anode, and a cathode; a pressure sensor configured to sense a pressure inside the electrolyzer housing; wherein the controller is configured to prevent a supply of gasoline fuel to the internal combustion engine when supplying the mixture of hydrogen and oxygen gases to the engine intake; and wherein the controller is configured to supply gasoline fuel to the internal combustion engine when a pressure in the electrolyzer falls below a predetermined threshold.

In accordance with another example aspect of the invention, a method of performing a cold start catalyst light-off for a vehicle having an internal combustion engine and an exhaust aftertreatment system with a catalytic converter is provided. In one example implementation, the method includes performing, at an electrolyzer, an electrolysis operation to generate a mixture of hydrogen and oxygen gases from a supply of water; detecting, by a controller having one or more processors, a vehicle cold start condition; and supplying the mixture of hydrogen and oxygen gases to an intake of the engine for combustion therein to facilitate rapidly warming the catalytic converter to a light-off temperature.

In addition to the foregoing, the described method may include one or more of the following features: wherein supplying the mixture of hydrogen and oxygen gases is performed only during the engine cold start condition before the catalytic converter has reached a light-off temperature; preventing a supply of gasoline fuel to the internal combustion engine while supplying the mixture of hydrogen and oxygen gases to the engine intake; supplying gasoline fuel to the internal combustion engine when a pressure in the electrolyzer falls below a predetermined threshold; increasing a supply of gasoline fuel to the internal combustion engine as a pressure decreases in the electrolyzer; supplying water from a water storage tank to the electrolyzer; wherein the electrolyzer includes a housing, an anode, and a cathode; a pressure sensor configured to sense a pressure inside the electrolyzer housing; and a flow control valve configured to control a flow of the mixture of hydrogen and oxygen gases from the electrolyzer to the internal combustion engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Some conventional aftertreatment systems have limited or no capacity to get the catalyst to a light-off temperature for efficient conversion of harmful exhaust constituents in the short period of time post cold start. Every second the engine is running and the catalyst is not at or above light-off temperature, exhaust gas constituents such as CO, HC, NMHC and NOx are not being converted efficiently. The short time preceding the catalyst light-off is responsible for a very large portion of the CO, HC, and NOx breakthrough for on and off cycle starts and long idles.

Accordingly, described herein are systems and methods for eliminating cold start emissions of hydrocarbons (HC) and carbon monoxide (CO) during the catalyst light-off phase. Instead of using gasoline in a sub-optimal manner to heat the catalyst, the system utilizes hydrogen gas, which is known as a clean fuel compared to gasoline. To produce the fuel, the system includes a water storage tank that supplies water to a water electrolysis device to generate hydrogen (H2) and oxygen (O2). The mixture of H2 and O2 is then combusted in the engine or, alternatively combusted in the catalyst, to thereby warm the catalyst without producing HC and CO emissions.

In one example, while the internal combustion engine is warmed and running, a canister is filled with hydrogen (H2) and oxygen (O2) under moderate pressure by electrolyzing liquid water to separate the water molecule into H2 and O2 gases. The gases are left mixed so that when fed back into the engine intake manifold, they are pre-mixed in the correct proportion such that they do not modify the air-fuel ratio. Upon cold starting the engine, the H2 and O2 gases are released into the intake manifold, ingested through the intake valves into the combustion chamber. The gases are subsequently compressed and ignited by the spark ignition in a conventional manner. As the products of the combustion of the H2 and O2 gases are released from the exhaust valves into the exhaust aftertreatment system, they do not contain HC or CO, thereby reducing cold start emissions. A control system detects depletion of the H2 and O2 gases in the canister, for example, by either the reduction of the idle speed or signals from a heated exhaust oxygen sensor, and gasoline is then added to the intake manifold or combustion chamber for normal operation.

Figure 1:
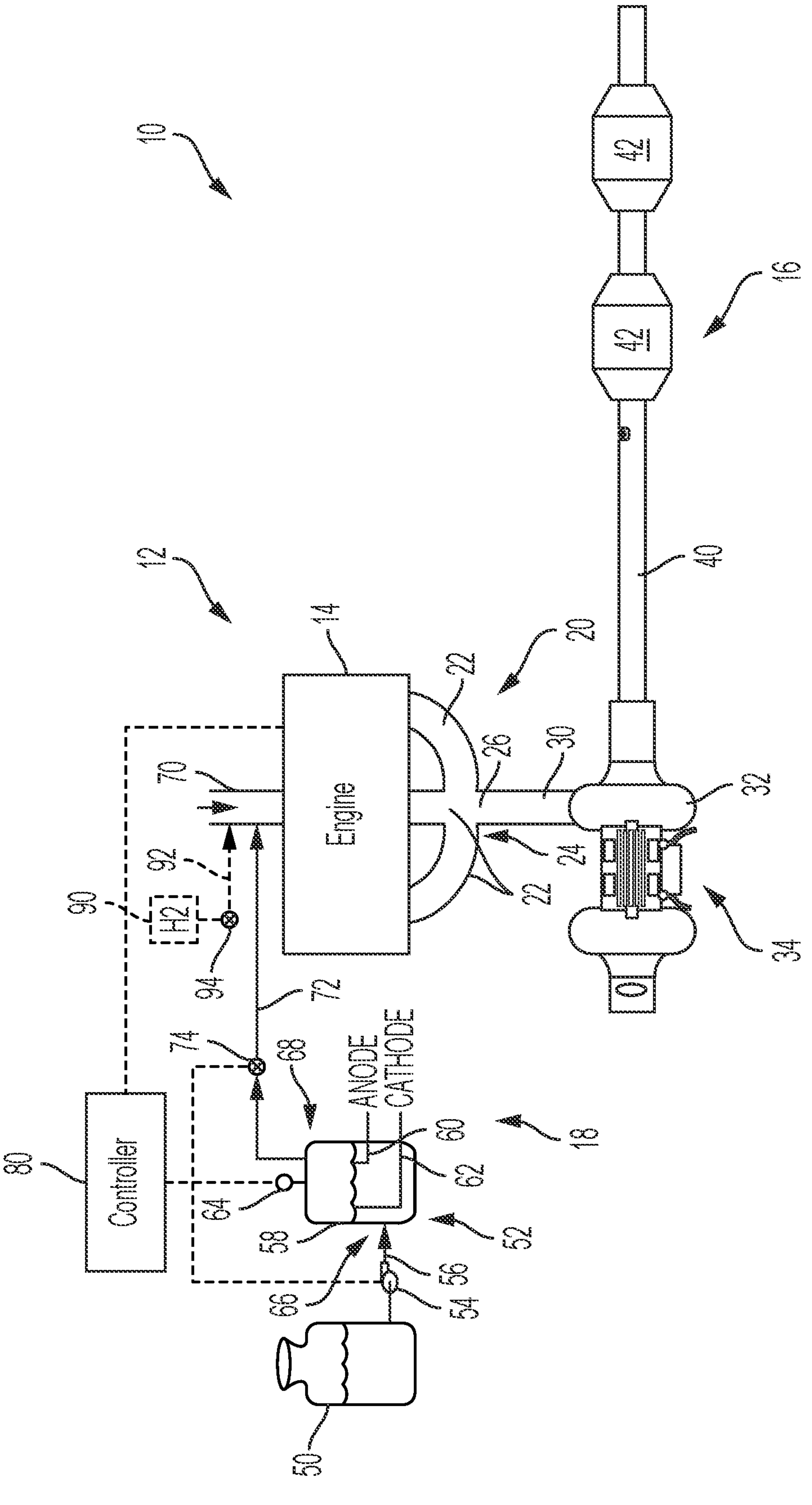
FIG. 1 is a schematic illustration of an example internal combustion engine with a light-off catalyst bypass system, in accordance with the principles of the present application.

With initial reference to FIG. 1, an internal combustion engine system 10 having an internal combustion engine 12 with a cylinder head 14 is illustrated in accordance with the principles of the present application. In the example embodiment, the cylinder head 14 is configured to selectively supply exhaust gas to an exhaust aftertreatment system 16 having a cold start catalyst light-off system 18. As described herein in more detail, the catalyst light-off system 18 is selectively utilized during cold start, long idle, and/or cold catalyst conditions to rapidly heat to light-off temperatures to quickly achieve low tailpipe emissions.

As shown in FIG. 1, the engine system 10 further includes an exhaust manifold 20 having a plurality of cylinder exhaust passages 22 that merge together to form a collector portion or main exhaust passage 24 having an outlet 26. In some embodiments, the exhaust manifold 20 may be coupled (e.g., bolted) to the cylinder head 14 or alternatively integrated therein. A main outlet duct 30 receives exhaust gas from the manifold outlet 26 and is configured to direct the exhaust gas to the exhaust aftertreatment system 16. In the illustrated example, the main outlet duct 30 is configured to provide exhaust gas to a charger device, such as a turbine 32 of a turbocharger 34. It will be appreciated that the charger device may be a supercharger rather than a turbocharger, or engine 12 may not include a charger device such that main outlet duct 30 is directly connected to the exhaust aftertreatment system 16.

In the example embodiment, the exhaust aftertreatment system 16 generally includes a main exhaust conduit 40 having one or more catalytic converters 42 to reduce or convert a desired exhaust gas constituent such as, for example, carbon monoxide (CO), hydrocarbon (HC), and/or nitrogen oxides (NOx). The main exhaust conduit 40 is fluidly coupled to the exhaust manifold main outlet 26 (optionally via the turbocharger turbine 32) and is configured to receive exhaust gas from the vehicle engine 12 and supply the exhaust gas to the catalytic converter 42. In order to efficiently reduce or convert CO, HC, and NOx, the catalytic converter 42 must reach a predetermined light-off temperature. However, during some vehicle operations such as cold starts, the catalytic converter 42 is below light-off temperature and therefore has a low catalyst conversion efficiency.

In order efficiently reduce or convert the unwanted exhaust gas constituents while the catalytic converter 42 is below the light-off temperature, the vehicle utilizes the cold start catalyst light-off system 18, which generally includes a water storage tank 50 and an electrolyzer 52. The water storage tank 50 is configured to hold liquid water, and a pump 54 is configured to selectively supply the water to the electrolyzer 52 via a conduit 56. The electrolyzer 52 generally includes a housing 58, an anode 60, a cathode 62, and a pressure sensor 64. The housing 58 includes an inlet 66 and an outlet 68. The inlet 66 is in fluid communication with the conduit 56 to receive water from the water storage tank 50, and the outlet 68 is in fluid communication with an intake 70 of the engine 12 via a conduit 72.

In the example embodiment, the anode 60 and cathode 62 are connected to a source of electricity (e.g., a battery, not shown) and the electrolyzer 52 is configured to perform electrolysis to split the water stored in housing 58 into H2 and O2 gases. In one example, the anode 60 and cathode 62 are coiled with a permeable insulator to maintain separation therebetween while also providing a large reactive surface area to produce adequate amounts of H2 and O2 gases. The pressure sensor 64 is configured to measure a pressure in the housing 58, and the electrolysis is stopped when the measured pressure reaches a predetermined maximum threshold. A flow control valve 74 is configured to selectively control a flow of the H2 and O2 gases to the engine intake 70.

A controller 80 (e.g., engine control unit) is in signal communication with the electrolyzer 52, the pump 54, the pressure sensor 64, and the flow control valve 74. The controller 80 is configured to selectively operate the pump 54 to supply water from the storage tank 50 to the electrolyzer housing 58, selectively perform the electrolysis based on one or more signals from the pressure sensor 64, and selectively operate the flow control valve 74 to supply H2 and O2 gases to the engine intake 70.

In one example operation, water is pumped from the storage tank 50 to the electrolyzer 52 during a warmed-up operation of the engine 12. Electrolysis is performed in the electrolyzer 52 until the pressure in housing 58 reaches the predetermined maximum threshold, as measured by the pressure sensor 64. Upon the next vehicle cold start, the pre-mixed H2 and O2 gases in the housing 58 are supplied to the engine intake 70 via the flow control valve 74. Fuel injectors (not shown) of the internal combustion engine 12 are shut-off, but the spark plugs are operated in a normal manner during the cold start and catalyst light-off phases. The H2 and O2 gases are combusted in the engine 12 and the resulting hot exhaust gas is directed to the exhaust aftertreatment system 16.

Without the presence of gasoline fuel, the exhaust gas only includes atmospheric air and some water and thus does not contain HC or CO, and only trace amounts of NOx, thereby reducing cold start emissions. The heated exhaust gas rapidly warms the exhaust aftertreatment system 16 and thus the catalyst 42. As the gases in the electrolyzer 52 are depleted, the pressure drops in the housing 58 until a predetermined minimum threshold, as measured by the pressure sensor 64. As the flow of H2 and O2 gases to the engine 12 is reduced, the flow of fuel through the fuel injectors is increased (e.g., in synchronization). For example, the controller 80 may include software or algorithms to control the electrolyzer 52, the pump 54, the flow control valve 74, and the fuel injectors during the cold start and catalyst light-off phases. Once the catalyst 42 meets or exceeds the catalyst light-off temperature, the flow of H2 and O2 gases is ceased and the operation is repeated by once again pumping clean water from the storage tank 50 to the electrolyzer 52.

With continued reference to FIG. 1, in an alternative configuration, cold start catalyst light-off system 18 only includes an on-board hydrogen storage tank 90 (shown in phantom). The hydrogen storage tank 90 is configured to supply hydrogen gas to the engine intake 70 via a conduit 92 and valve 94 rather than producing the hydrogen via the electrolyzer 52. The hydrogen is then mixed with intake air and combusted in the engine 12 to rapidly warm the cold exhaust aftertreatment system 16. In yet another alternative configuration, the H2 and O2 gases separated in the electrolyzer 52 may be separately stored and then recombined in the intake manifold 70 for combustion, or the H2 gas may only be stored and then combined with ambient intake air.

Figure 2:
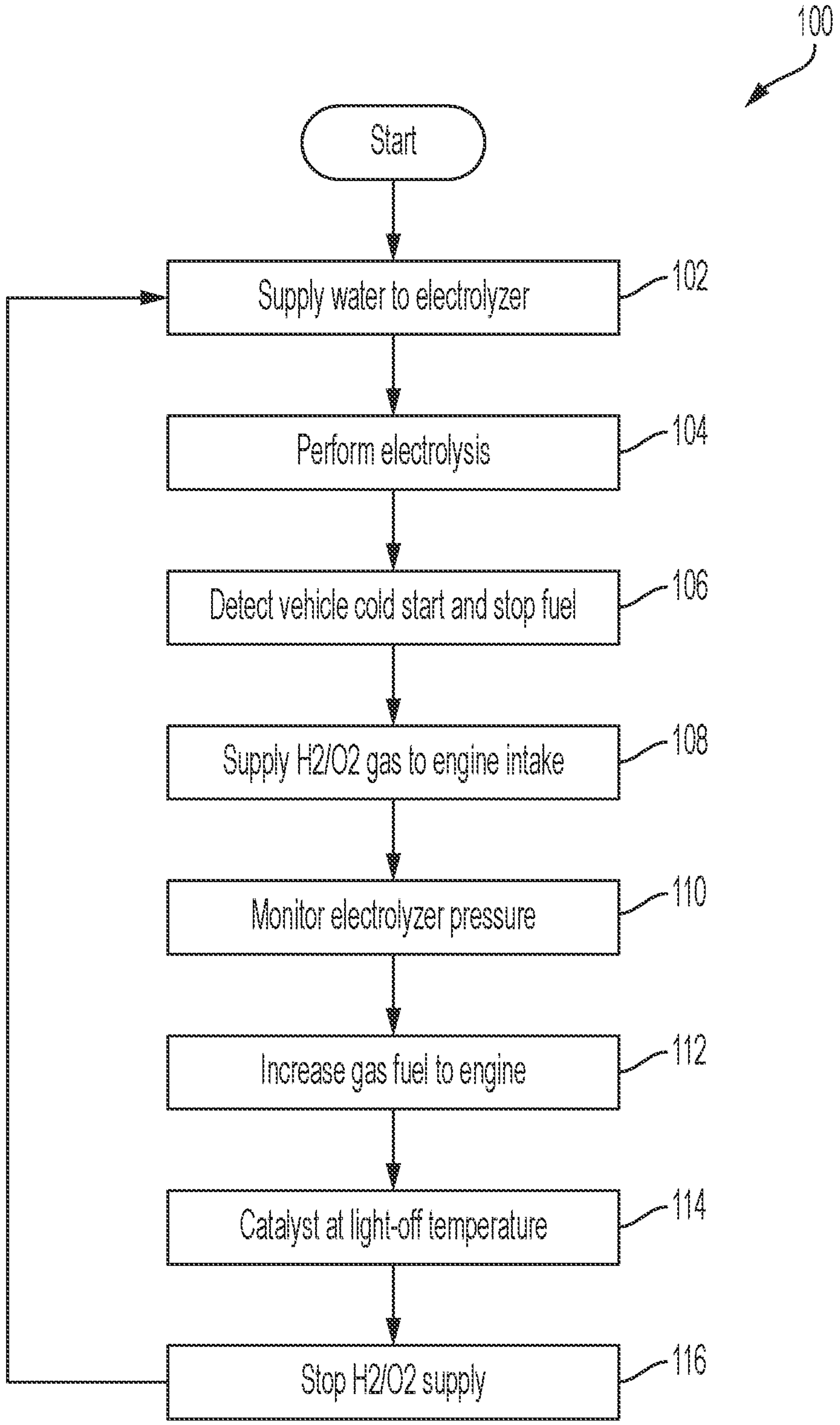
FIG. 2 is a flow diagram of an example method of operating the light-off catalyst system, in accordance with the principles of the present application.

With reference now to FIG. 2, a flow diagram of an example method 100 of performing a cold start catalyst light-off is illustrated. At step 102, controller 80 supplies water from the storage tank 50 to the electrolyzer 52. At step 104, controller 80 performs an electrolysis operation at the electrolyzer 52 to generate H2 and O2 gases from the supplied water. At step 106, controller 80 detects a vehicle cold start and disables or prevents the fuel injectors from supplying fuel to the engine cylinders. At step 108, controller 80 subsequently supplies the mixture of H2 and O2 gases to the engine intake 70 and fires the engine 12 for combustion of the gases to rapidly heat the exhaust aftertreatment system 16.

At step 110, controller 80 monitors pressure sensor 64. At step 112, controller 80 increases a supply of fuel through the fuel injectors as the pressure decreases in the electrolyzer housing 58. At step 114, controller 80 determines the catalyst 42 has reached a light-off temperature (e.g., via temperature sensor, not shown). At step 116, controller 80 ceases the supply of H2 and O2 gases from the electrolyzer 52 to the engine intake 70, for example, once the light-off temperature is achieved. Engine 12 may then be operated normally with gasoline fuel. Control then returns to step 102 and again supplies water to the electrolyzer 52 and performs the electrolysis to refill the housing 58 with H2 and O2 gases for the next cold start.

Described herein are systems and methods for performing a cold start catalyst light-off with reduced emissions. The system utilizes water electrolysis to produce a mixture of hydrogen and oxygen gas. During a cold start, fuel injection is initially disabled and the hydrogen/oxygen gas mixture is supplied to the engine for combustion. This combustion produces heated exhaust gas without hydrocarbons or carbon monoxide. Thus, the catalyst can be rapidly warmed without producing unnecessary HC and CO emissions. As the hydrogen and oxygen gases are depleted, fuel injection is increased until the vehicle returns to normal operation.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An internal combustion engine system comprising:

an internal combustion engine;

an exhaust aftertreatment system with a catalytic converter configured to receive exhaust gas from the internal combustion engine;

a light-off catalyst system including a canister with an electrolyzer therein configured to perform an electrolysis of water to produce a mixture of pressurized hydrogen and oxygen gases, which is stored within the canister;

a conduit in fluid communication between the canister and an intake of the internal combustion engine; and a controller configured to supply the mixture of hydrogen and oxygen gases to the engine intake during a cold start to facilitate rapidly warming the catalytic converter to a light-off temperature.

2. The internal combustion engine system of claim 1, further comprising a water storage tank configured to selectively supply water to the electrolyzer when the engine is warmed up to thereby replenish the mixture of hydrogen and oxygen gases within the canister.

3. The internal combustion engine system of claim 1, wherein the controller is configured to, once a pressure in the canister reaches a predetermined minimum threshold, synchronize an increase in a flow of hydrocarbon fuel to the engine while decreasing the flow of the mixture of hydrogen and oxygen gases to the engine.

4. The internal combustion engine system of claim 2, further comprising a pump configured to selectively supply the water from the water storage tank to the electrolyzer.

5. The internal combustion engine system of claim 1, further comprising a flow control valve disposed on the conduit to control the supply of the mixture of hydrogen and oxygen gases to the engine intake.

6. The internal combustion engine system of claim 5, wherein the controller is in signal communication with the flow control valve.

7. The internal combustion engine system of claim 1, wherein the electrolyzer includes an anode and a cathode.

8. The internal combustion engine system of claim 7, further comprising a pressure sensor configured to sense a pressure inside the canister.

9. The internal combustion engine system of claim 1, wherein the controller is configured to prevent a supply of gasoline fuel to the internal combustion engine when supplying the mixture of hydrogen and oxygen gases to the engine intake.

10. The internal combustion engine system of claim 9, wherein the controller is configured to supply gasoline fuel to the internal combustion engine when a pressure in the canister falls below a predetermined threshold.

11. A method of performing a cold start catalyst light-off for a vehicle having an internal combustion engine and an exhaust aftertreatment system with a catalytic converter, the method comprising:

performing, at an electrolyzer disposed within a canister, an electrolysis operation to generate a pressurized mixture of hydrogen and oxygen gases from a supply of water, and subsequently storing the pressurized mixture of hydrogen and oxygen gases within the canister;

detecting, by a controller having one or more processors, a vehicle cold start condition; and supplying the mixture of hydrogen and oxygen gases to an intake of the engine for combustion therein to facilitate rapidly warming the catalytic converter to a light-off temperature.

12. The method of claim 11, wherein supplying the mixture of hydrogen and oxygen gases is performed only during the engine cold start condition before the catalytic converter has reached a light-off temperature.

13. The method of claim 11, further comprising preventing a supply of gasoline fuel to the internal combustion engine while supplying the mixture of hydrogen and oxygen gases to the engine intake.

14. The method of claim 13, further comprising supplying gasoline fuel to the internal combustion engine when a pressure in the canister falls below a predetermined threshold.

15. The method of claim 13, further comprising:

detecting, by the controller, that a pressure in the canister has fallen below a predetermined minimum threshold; and subsequently steadily increasing, by the controller, a supply of gasoline fuel to the internal combustion engine while simultaneously decreasing the supply of the mixture of hydrogen and oxygen gases to the engine intake.

16. The method of claim 11, further comprising supplying water from a water storage tank to the canister.

17. The method of claim 11, wherein the electrolyzer includes an anode and a cathode.

18. The method of claim 17, further comprising a pressure sensor configured to sense a pressure inside the canister.

19. The method of claim 11, further comprising a flow control valve configured to control a flow of the mixture of hydrogen and oxygen gases from the canister directly to the internal combustion engine.

20. The internal combustion engine system of claim 1, wherein the flow of the mixture of hydrogen and oxygen is supplied directly from the canister to the engine intake.

* * * * *